United States Patent Office 3,080,321
Patented Mar. 5, 1963

3,080,321
ISOMERIC MIXTURES OF DIPHENOXY-, DITOLOXY-, AND PHENOXYTOLOXYBENZENES AS FUNCTIONAL FLUIDS
Edward S. Blake, James W. Edwards, and William C. Hammann, Dayton, Ohio, assignors to Monsanto Chemical Company, St. Louis, Mo., a corporation of Delaware
No Drawing. Filed Aug. 9, 1957, Ser. No. 677,230
7 Claims. (Cl. 252—73)

This invention relates to novel compositions having properties which make them particularly suitable for use as functional fluids—i.e., hydraulic fluids, heat-transfer fluids, synthetic lubricants, and the like. More specifically, the invention relates to novel compositions which are particularly outstanding for use in extremely high temperature applications—i.e., as high as 700° F. and higher.

Modern day requirements for functional fluids are very exacting. For example, synthetic lubricants for jet engines, hydraulic fluids for supersonic aircraft, coolants for electronic equipment, etc. are often required to function at temperature extremes ranging from 700° F. or higher to sub-zero temperatures. These requirements pose the very difficult problem of finding compositions which are thermally stable at the very high temperatures and which remain in liquid form at low temperatures. It is also necessary to find materials which have adequate temperature-viscosity properties and lubricity—i.e., materials which will not get too thin at very high temperatures and/or too thick at low temperatures, and which will also have adequate lubricating characteristics at all temperatures.

We have now found that certain mixtures (specified in more detail below) of diphenoxybenzenes of the following class

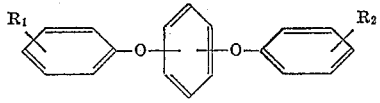

wherein $R_1$ and $R_2$ are either hydrogen atoms or methyl groups, are admirably suited for use as functional fluids under the conditions discussed above.

The present compositions can be readily obtained as reaction mixtures from an Ullmann ether synthesis—which relates broadly to ether-forming reactions of alkali metal (especially sodium or potassium) phenoxides and aromatic halides (especially bromides or chlorides) catalyzed by copper (for example, metallic or in the form of the hydroxides or salts). See Annalen, 350, 83 (1906); Berichte, 38, 2211 (1905). The present ethers can also be prepared by reactions involving alkali metal (especially sodium or potassium) salts of aromatic disulfonic acids and alkali metal phenoxides.

More particularly, the present compositions of mixed ethers (diphenoxybenzenes) are obtained by reaction of (1) a member of the group consisting of dihalobenzenes and alkali metal salts of benzenedisulfonic acids, and (2) a mixture consisting essentially of the alkali metal salts of the following:

Phenol _____ 0–30 mole percent.
p-Cresol _____ 0–20 mole percent.
m-Cresol-o-cresol __ Total of 50–50 mole percent, but no more than 60 percent (based on total phenol-cresol mixture) of either.

In making the compositions of this invention, the p-dihalobenzenes are generally preferred over the ortho- and meta-isomers. The latter two isomers can be used, however. Also, particularly because of availability and ease of reaction, the dibromo and dichloro species of dihalobenzenes are preferred. When using alkali metal salts of benzenedisulfonic acids, the meta-isomer is preferred—although the other isomers can be used if desired. It should also be apparent that mixtures of isomers of either the dihalobenzenes or the disulfonates can be used if desired.

Since halophenyl (or sulfonatophenyl) phenyl ethers and halophenyl (or sulfonatophenyl) tolyl ethers are formed as intermediates during the course of the foregoing reaction, it should also be apparent that a portion of the dihalobenzene (or benzenedisulfonate) may be replaced by the foregoing intermediates without substantially changing the nature of the final product.

The range of useful phenol-cresol compositions which can be utilized in the present invention has been set forth above. A more preferred range of such phenol-cresol mixtures is set forth below:

Phenol _____ 0–20 mole percent.
p-Cresol _____ 0–20 mole percent.
m-Cresol-o-cresol __ Total of 60–90 mole percent containing the meta- and ortho-isomers in mol ratios between 1:2 and 4:1, respectively.

Particularly outstanding combinations of optimum desirable properties can be obtained from diphenoxybenzenes prepared from the following phenol-cresol mixtures:

Phenol _____ 5–15 mole percent.
p-Cresol _____ 5–15 mole percent.
m-Cresol-o-cresol __ 70–90 mole percent containing the meta- and ortho-isomers in mol ratios between 1:1 and 3:1, respectively.

The following example is illustrative of the preparation of the diphenoxybenzene mixtures of the present invention:

Example

A mixture of 1260 grams of o-cresol, 1680 grams of m-cresol, 420 grams of p-cresol, 182 grams of phenol, 1402 grams of potassium hydroxide and 300 ml. of toluene was heated at reflux temperature until 485 ml. of water had been collected in a Dean-Stark trap. The hot mixture was charged to a 2-gallon top-stirred autoclave along with 2359 grams of p-dibromobenzene and 110 grams of $CuCO_3 \cdot Cu(OH)_2$ catalyst. The autoclave was heated to 140° C. and the excess toluene removed under vacuum. The autoclave was then sealed and heated at 250° C. for 20 hours, during which period the pressure in the autoclave reached a maximum of 40 lbs. per square inch gauge. The autoclave was then cooled and the contents were taken up in 3 liters of benzene and filtered to remove solid potassium bromide. The benzene was stripped from the filtrate and the residue distilled through an 11-inch Vigreux column to give the following fractions:

| Boiling range, °C./mm. Hg | Weight, grams | Refractive Index $n_D^{25}$ |
|---|---|---|
| 85°/15 mm.–145°/1 mm. | 211 | 1.5686–1.5936 |
| 145°–185°/1 mm. | 2,045 | 1.5940–1.5905 |
| 220°–240°/2 mm. | 95 | 1.5817 |
| Residue | 235 | |

The second of the foregoing fractions was taken up in 2.5 liters of benzene, washed with six 1-liter portions of 5% aqueous potassium hydroxide and three 1-liter portions of water, shaken with anhydrous sodium sulfate, filtered, and stripped of solvent up to 90° C./15 mm.

This residue was again distilled through an 11-inch Vigreux column to yield the following fractions:

| Boiling range, °C./mm. Hg | Weight, grams | Refractive Index $n_D^{25}$ |
| --- | --- | --- |
| 140°–155°/0.5 mm | 45 | 1.5952 |
| 155°–180°/0.5 mm | 1,914 | 1.5946–1.5950 |
| 180°/0.5 mm | 39 | 1.5958 |
| Residue | 65 | 1.6135 |

The second of the immediately preceding fractions was filtered through alumina and celite to give 1720 grams of light greenish-yellow colored product containing less than 0.01 percent bromine.

The foregoing compositions has many desirable properties making it outstandingly useful as a high-temperature functional fluid. For example, it has a vapor pressure of only 760 mm. at 734° F., yet is a non-crystallizing liquid having a pour point at −5° F. It has an ASTM slope (viscosity-temperature relationship as determined by ASTM Test D–341–39) of 0.88 (210°–400° F.).

The compositions of this invention have particularly outstanding thermal stability. This latter property was determined by an isoteniscopic method, e.g., as described by Smith and Menzies, Journal of the American Chemical Society, 32, 897, 907, 1412 (1910). The results are tabulated in the following table in terms of elapsed time required for 10 percent decomposition of the functional fluid. The table also includes a comparison with other available functional fluids.

| Composition | Time for 10% Decomposition | |
| --- | --- | --- |
| | At 700° F. | At 900° F. |
| Diphenoxybenzene mixture of present invention | 600 hr. | 1 hr.—21 min. |
| Bis(2-ethylhexyl) sebacate | 18 min. | 0.04 min. |
| Highly refined mineral oil | 6 hr.—30 min. | 0.04 min. |

Because of their uniquely high thermal stability, the present diphenoxybenzene compositions will generally be utilized as functional fluids in which they are substantially the only (or at least the predominant) constituent. However, under circumstances where the thermal stability and/or low temperature fluidity and/or viscosity-temperature characteristics and/or vapor pressure are of relatively less importance, the present diphenoxybenzene compositions can be utilized in conjunction with one or more other functional fluid bases such as silicate esters, phosphate esters, disiloxanes, silicones, mineral oils, polyalkylene glycols and similar well known functional fluids of the prior art. Likewise, the present diphenoxybenzenes can, if desired, be utilized with minor proportions of other relatively common fluid additives such as V.I. improvers, dyes, antioxidants, snuffer additives, antiwear additives, lubricity agents, extreme pressure additives, etc.

We claim:

1. A high-temperature functional fluid composition comprising essentially a mixture of diphenoxybenzenes obtained by reaction of (1) a member of the group consisting of dihalobenzenes and alkali metal salts of benzene disulfonic acids, and (2) a mixture consisting essentially of the alkali metal salts of the following:

| | |
| --- | --- |
| Phenol | 0–30 mole percent. |
| p-Cresol | 0–20 mole percent. |
| m-Cresol-o-cresol | Total of 50–95 mole percent, but no more than 60 percent (based on total cresol mixture) of either. |

2. A high-temperature functional fluid composition comprising essentially a mixture of diphenoxybenzenes obtained by reaction of (1) a p-dihalobenzene and (2) a mixture consisting essentially of the alkali metal salts of the following:

| | |
| --- | --- |
| Phenol | 0–20 mole percent. |
| p-Cresol | 0–20 mole percent. |
| m-Cresol-o-cresol | Total of 60–90 mole percent, containing the meta- and ortho-isomers in a molar ratio between 1:2 and 4:1. |

3. The composition of claim 2 in which the p-dihalobenzene is p-dibromobenzene.

4. The composition of claim 2 in which the p-dihalobenzene is p-dichlorobenzene.

5. A high-temperature functional fluid composition comprising essentially a mixture of diphenoxybenzenes obtained by reaction of (1) the alkali metal salts of m-benzenedisulfonic acid and (2) a mixture consisting essentially of the alkali metal salts of the following:

| | |
| --- | --- |
| Phenol | 0–20 mole percent. |
| p-Cresol | 0–20 mole percent. |
| m-Cresol-o-cresol | Total of 60–90 mole percent containing the meta- and ortho-isomers in a molar ratio between 1:2 and 4:1. |

6. A high-temperature functional fluid composition consisting essentially of a mixture of diphenoxybenzenes obtained by reaction of (1) p-dibromobenzene and (2) a mixture consisting essentially of the alkali metal salts of the following:

| | |
| --- | --- |
| Phenol | 5–15 mole percent. |
| p-Cresol | 5–15 mole percent. |
| m-Cresol-o-cresol | Total of 70–90 mole percent containing the meta- and ortho-isomers in a molar ratio between 1:1 and about 3:1, respectively. |

7. A high-temperature functional fluid composition consisting essentially of a mixture of diphenoxybenzenes obtained by reaction of (1) p-dichlorobenzene and (2) a mixture consisting essentially of the alkali metal salts of the following:

| | |
| --- | --- |
| Phenol | 5–15 mole percent. |
| p-Cresol | 5–15 mole percent. |
| m-Cresol-o-cresol | Total of 70–90 mole percent containing the meta- and ortho-isomers in a molar ratio between 1:1 and about 3:1, respectively. |

References Cited in the file of this patent

UNITED STATES PATENTS 2,347,393    Bousquet et al. _____ Apr. 25, 1944

OTHER REFERENCES

Ullmann et al. Annalen, vol. 350 (1906), pp. 96–101 (6 pages).

Staudinger: Annalen, vol. 517 (1935), pp. 67–72 (6 pages).

(Copies in Patent Office Library.)